United States Patent [19]
Townley

[11] Patent Number: 5,829,208
[45] Date of Patent: Nov. 3, 1998

[54] HURRICANE OR TORNADO SHELTERS

[76] Inventor: R. John Townley, 158 Las Palmas Blvd., North Fort Myers, Fla. 33903

[21] Appl. No.: 50,296

[22] Filed: Mar. 30, 1998

[51] Int. Cl.$^6$ ..................................................... E04H 9/14
[52] U.S. Cl. .............................. 52/169.6; 52/244; 52/245; 52/169.1
[58] Field of Search ............................... 52/169.6, 169.2, 52/244, 245, 169.1

[56] References Cited

U.S. PATENT DOCUMENTS

| | | | |
|---|---|---|---|
| 3,038,565 | 6/1962 | Bruce | 52/169.6 X |
| 3,049,835 | 8/1962 | Sundstrum | 52/169.6 |
| 3,159,117 | 12/1964 | Rosenfeld | 52/169.6 |
| 3,164,111 | 1/1965 | Lanni | 52/169.6 X |

FOREIGN PATENT DOCUMENTS

| | | | |
|---|---|---|---|
| 419542 | 4/1947 | Italy | 52/169.6 |
| 454429 | 6/1968 | Switzerland | 52/169.6 |

*Primary Examiner*—Robert Canfield

[57] ABSTRACT

The invention relates to a hurricane or tornado shelter that is easily obtained or constructed form available elements that are already on the market and therefore does not require any major engineering to thereby keep the cost of installing the same very low and the cost can be shared by other families when installing the same. The structure used as a shelter consists of a steel reinforced cylindrical structure having a bell-shaped end at one end and a spigot at the other end. It is of a size to comfortably protect up to 10 people within its interior. One end of the structure is closed by a concrete end wall while the other end is partially closed by a slanting concrete deflector wall. The deflector wall at its upper end may or may not be fastened to the top of the cylindrical structure. There may be a central multi-way structure having up to four extensions, branches or ports that can be extended to a larger unit by inserting individual cylindrical structures that each may be partially closed by slanting concrete deflector slabs.

15 Claims, 4 Drawing Sheets

HURRICANE OR TORNADO SHELTERS

This invention is concerned with shelters to be used or occupied during the event of hurricanes or tornadoes. there are many ways to protect oneself from the above named catastrophic events such as basements or cellars that are covered with concrete slabs or other sturdy or rigid foundations that remain intact when in a worst case scenario the upper housing structure is destroyed or blown away. From the experience of past years hurricanes that swept through various parts of the State of Florida and other States, there is very little protection available within a short notice to homeowners or occupants of recreational vehicles or mobile homes to protect against the devastating forces of a hurricane or a tornado. While a hurricane can be tracked for considerable more time than a tornado which can develop within a half hour or so, it is important that people have strong shelters available within a short distance or in close proximity to where they live. The best known shelter available would be the old root cellar or potato cellar on a farm as was best shown in the now famous movie "the Wizard of Oz". It should also be noted that a hurricane has quite a different wind characteristic or aerodynamics than a tornado. A hurricane normally has horizontal wind forces that can level anything that presents a substantial flat surface to the same such as houses, warehouses, mobile homes, trailer trucks, railroad cars etc. All of the above named structures are known to have been blown over depending upon the force of the winds. A tornado on the other hand displays entirely different wind forces, These are swirling wind forces that can reach wind speeds of over 200 M/PH. This kind of wind force creates a type of suction force that has a tendency to pick up all sorts of structures to transport the same to a different location. As mentioned above, most protections of any value are located below ground. But, there are many areas where a below ground installation is not feasible or possible because of high water tables that will not allow a below ground installation. One such place, for example, is the State of Florida. Therefore, different measures have to be taken to afford a viable protection against hurricanes and tornadoes.

OBJECTS OF THE INVENTION

It is an object of the invention to provide a hurricane or tornado shelter that is placed substantially at the ground surface, it is easily accessible from adjacent dwellings, it is heavy enough so that it can not be disturbed by any kind of strong winds, be it a hurricane type or tornado type. The structures to be used are readily available in the market place but for a different use. The cost of a single unit is reasonable and the sizes are large enough to accommodate several families allowing the cost to be shared. However, a single unit can be extended or expanded considerably without having to make major alterations so that one such extended unit can accommodate a larger community or development. The unit or units would also be of some value as play houses for the children in the neighborhood without losing the initial intent of the unit or the units because they are virtually indestructible.

DETAILED DESCRIPTION OF THE DRAWINGS

Figure 1:
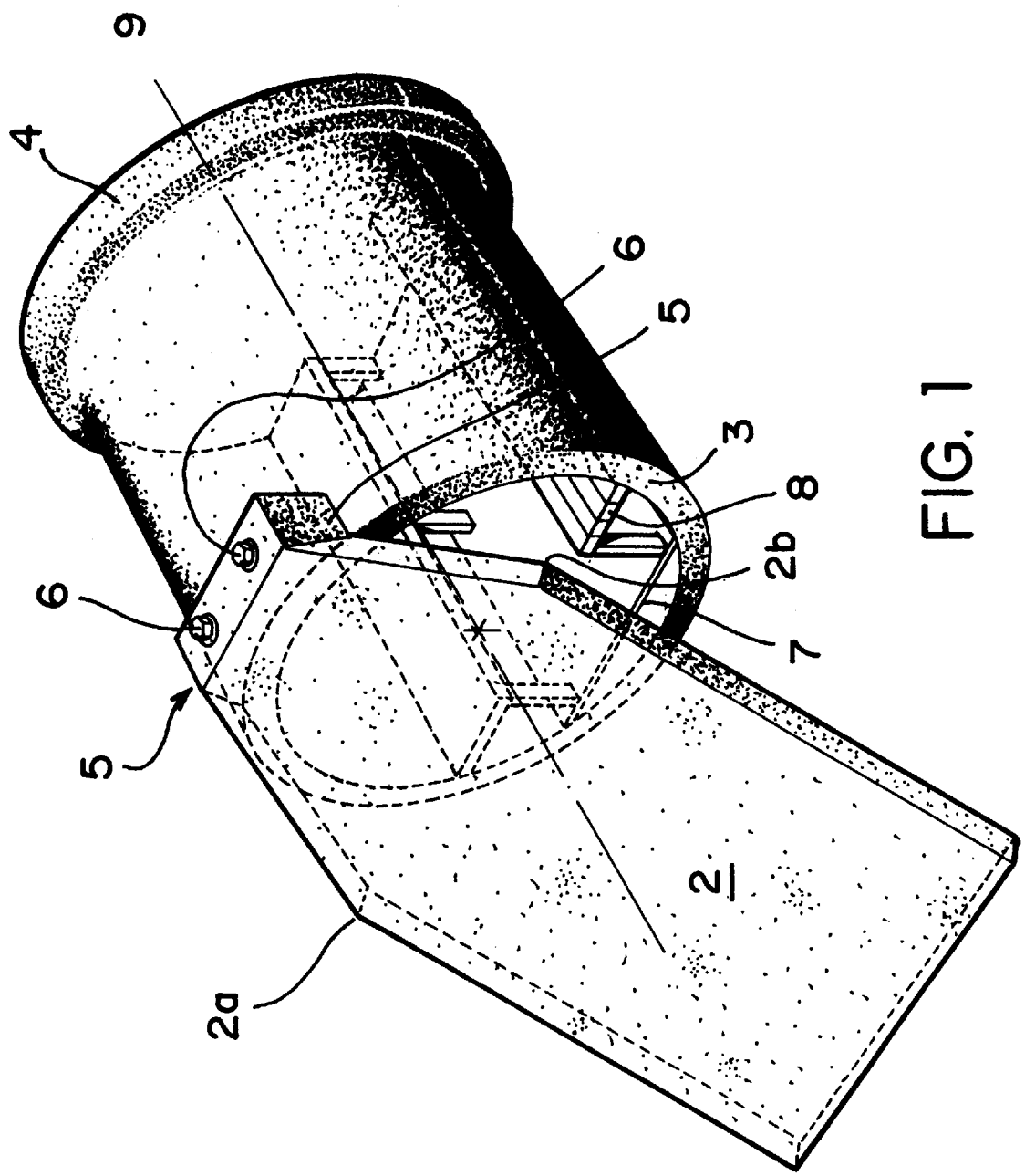
FIG. 1 shows a perspective view of the shelter

FIG. 1 shows the basic invention in a perspective view. The shelter basically consists of a tubular structure 1, originally having open ends. The structure 1 is preferred to be in the shape of a cylinder because it is readily available on the open market as will be explained below. Other shapes such as triangular or rectangular may be used but they are not preferred or recommended. Because this shelter is to be used as a protection against tornadoes or hurricanes, other structural shapes such as triangles or squares offer too much frontal surfaces against the forces of the winds associated with the named storms, so that the energy created by the winds will be strong enough to dislodge the structure from where it had been placed. A cylindrical outside surface, no matter how it is being attacked by the energy of the wind forces cannot be dislodged relative to the ground because the curvature of the cylindrical form tends to dissipate the wind forces to thereby offer no point of attack against the structure. As was mentioned above, the cylindrical concrete structure contemplated is readily available on the open market and therefore does not require special forms to make the same. These circular structures are available in 6', 7', 8' or 9' diameters and in 8' lengths. They are mainly used in highway constructions as culverts under the highway so that water can pass there under. They can be installed in trenches as large scale sewer lines. The cylindrical structure 1 shown in FIG. 1 and other Figrs. hereinafter, have a bell-shaped end 4 and spigot end 3. The spigot end 3 is normally somewhat tapered so that it can easily slide into the bell-shaped end 4 to obtain a continuous pipe line.

The bell-shaped end 4 will receive a closed wall as will be explained below. The other end of the cylindrical structure 1 receives a slanted concrete wall 2. The wall 2 is attached to the top of the cylinder 1 by a narrowed formed end 5 of wall 2 which conforms to the curvature of the top of the cylinder 1. When forming the wall 2, this narrow conforming end 5 can easily be formed when the concrete slab is being cast or molded. It may not suffice to simply place the concrete slab 2 on top of the cylinder 1 because the high shear winds of a hurricane could dislodge the concrete slab 2 laterally or the suction of hurricanes could lift the slab. Therefore, bolts 6 are being used to fasten the slab downwardly to the top of the cylindrical structure 1. It should be noted that the concrete slab 2 has extended wings 2a and 2b that may align with the outer outline of the cylinder 1 or may even extend beyond the same. The purpose of this is to deflect high velocity winds, if they come from that direction, so as not to enter the interior of the cylinder 1. It is preferred that the interior of the cylinder 1 have a low floor 7 so that benches 8 may be placed therein. The floor 7 will be explained in more detail with reference to FIG. 3.

Figure 2:
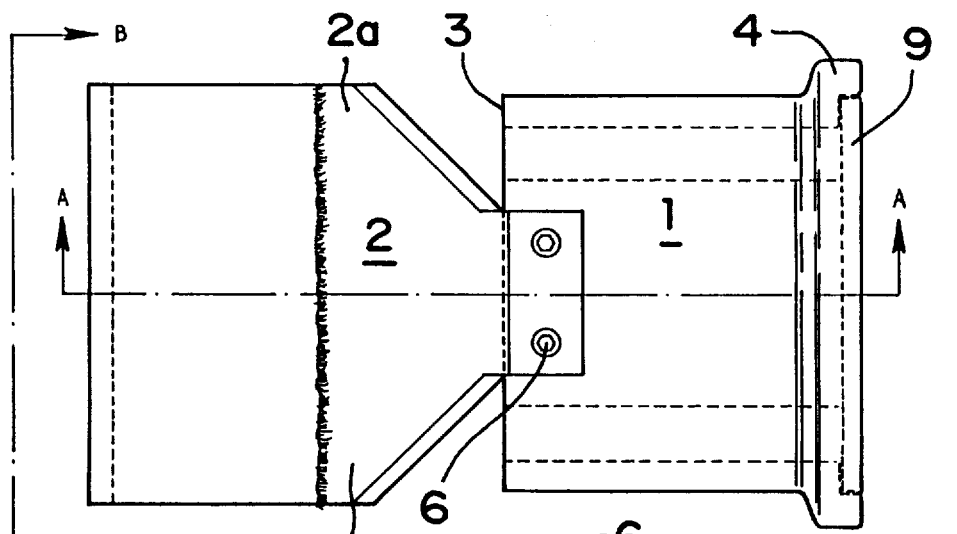
FIG. 2 is a top view of the shelter of FIG. 1

FIG. 2 is a top view of FIG. 1 with the same reference characters being applied. Notice the end wall 9 cast or otherwise fastened into the bell shaped opening 4. It can also be seen that the edges 2a and 2b extend beyond the exterior outline of cylinder 1. Fasteners or bolts 6 are clearly visible.

Figure 3:
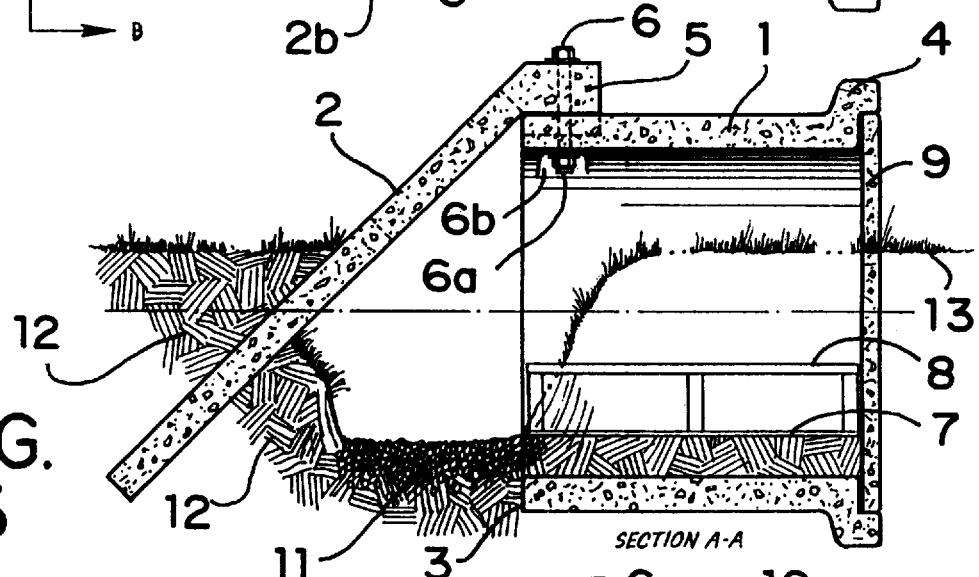
FIG. 3 is a cross-section of the shelter of FIG. 1

FIG. 3 is a cross-sectional view of the shelter as shown in FIG. 1. Again the same reference characters are applied as used in previous Figs. Again the closure wall 9 in the bell-shaped opening 4 is shown. There is a more detailed showing of how the slanted deflector slab 2 is fastened to the top of the cylindrical surface 1. To this end, the bolts 6 pass through the formed end 5 of slab 2, through the wall of cylinder 1 into the interior of the same. It is preferred that the interior surface of the curved wall of the cylinder be cut or molded into a localized shape 6b so that the nut 6a will seat on a surface that is normal to the longitudinal direction of bolt 6 instead of being pressed against a tangent of the interior wall surface of cylinder 1. The lower end of wind deflector concrete slab 2 is placed on the ground or somewhat below. It is important that this end be secured so that it cannot be lifted up by the forces or energy of the prevailing winds. It is preferred that this end be backfilled by soil or dirt as is shown at 12. Also the bottom level of the entrance to the cylindrical shelter 1 should have a deposit of gravel 11 to maintain this area of the shelter 1 in a stable and dry condition. Inside the bottom of the tube or cylinder 1, directly under floor 7, there could be a deposit of dirt, soil or gravel to prevent the floor from sagging. The sides of the tubular cylinder 1 could also be backfilled with dirt or soil to a level as shown at 13. This is preferred as a safety measure, because as mentioned above, the shelter once it is installed could also serve as a playground or playhouse for children The children may tend to climb on the structure and backfilling the structure to at least half of its outside height as at 13 may prevent falls that may be injurious to the children. Also the backfill may prevent at least very strong winds to dislodge the structure relative to the ground.

Figure 4:
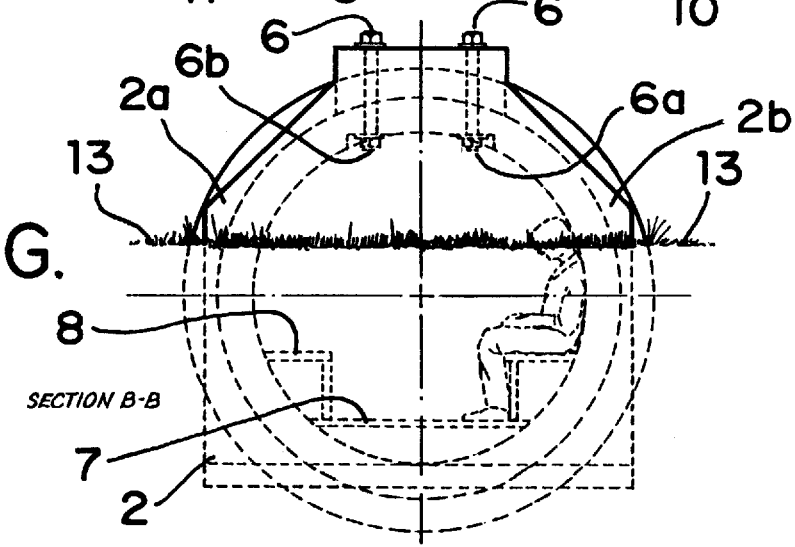
FIG. 4 is an end view of the shelter of FIG. 1

Referring now to FIG. 4 which shows an end view of the shelter of the invention. Like reference numerals are applied to the same elements as shown in earlier Figrs. It is noted that a simulated person 8a sitting on bench 8 indicates the relative size between the shelter 1 and the person. Thus, it is entirely possible to accommodate at least 8 to 10 persons in a shelter discussed so far. This could mean that at least two families could be protected in a shelter as described above.

Figure 5:
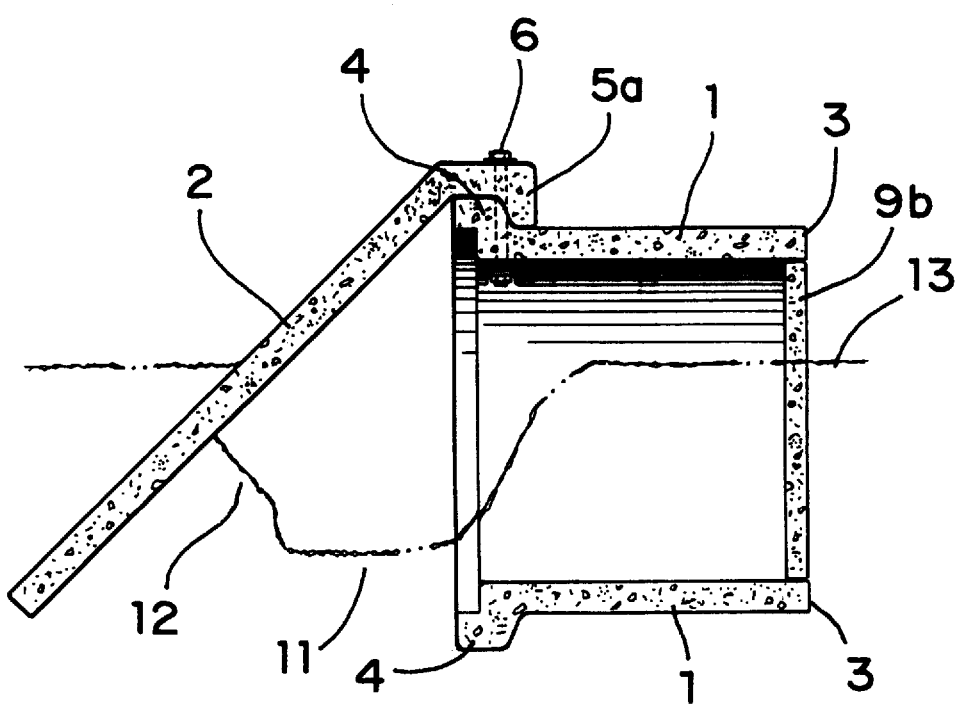
FIG. 5 shows a different embodiment of the shelter of FIG. 1

FIG. 5 shows a different embodiment of this invention in that the end that had been closed is being reversed. Thus, the bell shaped end 4 that had been closed by a concrete plate 9 is left open and the spigot end 3 is closed by a concrete plate 9b. Because of the above, the formed end 5a of the slanted concrete slab 2 has to be reformed or recast so that it will reach over the bell 4 and behind it.

This forming and/or casting can easily be done when the slab 2 is being cast or molded. The application of bolts 6 is the same as was previously explained.

Figure 6:
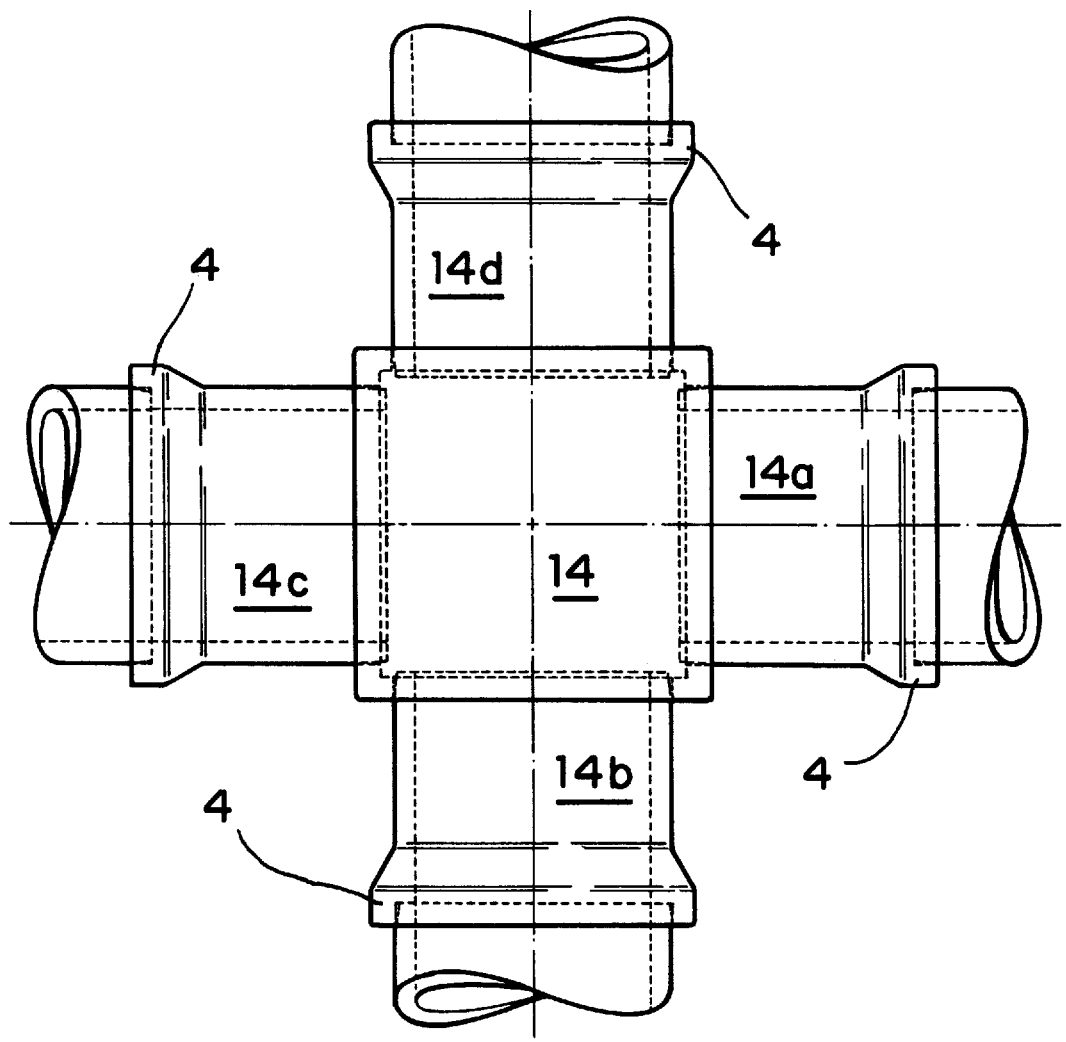
FIG. 6 shows a different and multiple layout of the shelter of FIG. 1.

Turning now to FIG. 6, there is shown a display of a larger system that can be installed centrally or in other locations in larger communities such as trailer or RV parks. To this end there is shown a central configuration of a concrete structure 14 having four end openings 14a–14b. Each of the openings would have a bell-shaped configuration to accommodate other cylindrical structures as shown in FIGS. 1–5 having so-called spigot ends that can be used to extend the central unit into different directions and to increase the size of the overall shelter to protect many more inhabitants of the area in question. All other aspects as discussed above are the same. Of course, the shape of the bell-shaped ends 14a–14d could be reversed to exhibit the spigot ends 3.

SUMMARY OF THE INVENTION

The operation of the invention should be clear by now. When constructing or placing the invention in place it is preferred that a shallow ditch be dug first that is later filled with gravel. The weight of the precast concrete cylinder will settle the cylinder at about ground level. It is also preferred that the cylinder 1 will also be placed at a slight inclination of a few degrees from the horizontal toward the open end of the cylindrical structure so that any water accumulating within the structure or driven into the same by forceful winds can easily drain out from the bottom. Next, the concrete deflector slab 2 will be placed against the top of the cylinder but at an angle relative to the ground. Once the correct or desired angle has been established, the concrete slab may now be fastened by bolts 6 as is shown in the various Figs. However, it is not absolutely necessary to fasten the slab 2 to the top of cylinder 1 because the weight of the concrete slab my suffice alone to maintain the slab in place no matter would kind of forces of the wind are applied and from which direction. also the angle at which the concrete slab 1 is placed relative to the ground should be considered. The slab 1 could be placed at an angle from 45° to 65°. Calculations have proven that an angle of 60° is most beneficial and therefore most desirable. The lower or ground contacting end of the concrete slab should be secured as much as possible. This could be accomplished by placing the bottom in the ground at a level that is lower than the bottom circumference of the cylinder 1. Thereafter, the slab could be backfilled with soil, dirt or gravel as much as is possible as is shown at 12 in FIG. 3.

The ends of the four-way structure of FIG. 6 could be protected in the same manner as was described above. The only difference is that the four-way structure 14 must be placed as close to a perfect horizontal as is possible. Also, the ends, that are shown as having a bell-shaped configuration, could be reversed to exhibit spigot ends whereby the extensions 14a to 14d with their respective bell-shaped ends will have to slide over the respective spigots of the four-way structure 14 when completing the installation

What I claim is:

1. A hurricane or tornado shelter comprising a tubular structure consisting of concrete being reinforced with steel bars and being of a size to comfortably accommodate at least 10 persons therein, one end of said structure being closed by a concrete wall with the other end of said structure being partially closed by a slanted concrete deflector slab having upper and lower ends, said upper end of said deflector slab is in contact with an upper surface of said structure while said lower end of said concrete deflector slab is in contact with the ground on which said structure rests but at a point away therefrom.

2. The shelter of claim 1 wherein the structure includes a bell-shaped end and a spigot end.

3. The shelter of claim 2, wherein said bell-shaped end has said closed concrete wall therein.

4. The shelter of claim 2, wherein said spigot end has said closed concrete wall therein.

5. The shelter of claim 1, including means for fastening said slanted concrete deflector slab to said structure at a point where said slab contacts the upper surface of said structure.

6. The shelter of claim 2, including an enlarged end at said upper end of said concrete deflector slab and so formed to conform to the bell-shaped end of said structure and to reach behind the same.

7. The shelter of claim 2, including an enlarged end at said upper end of said concrete deflector slab and so formed to conform to said spigot end of said structure and to rest on the same.

8. The shelter of claim 1 wherein said concrete deflector slab forms an angle relative to the ground of 45° to 65°.

9. The shelter of claim 1 wherein said concrete deflector slab forms an angle of 60° relative to the ground.

10. The shelter of claim 1 wherein a floor is placed in the interior of said structure and at a bottom thereof.

11. The shelter of claim 10 including benches placed on said floor.

12. The shelter of claim 1, wherein said structure is partially buried within dirt, soil or gravel including said concrete deflector slab.

13. The shelter of claim 1 wherein said concrete structure has a cylindrical shape.

14. The shelter of claim 13, wherein said concrete deflector slab has a width that extends beyond the circumference of said cylinder.

15. A hurricane or tornado shelter comprising a steel reinforced multi-way structure having placed at each of its ends the structure of claim 1.

* * * * *